United States Patent [19]

Foster

[11] Patent Number: 5,565,162
[45] Date of Patent: Oct. 15, 1996

[54] METHOD FOR MANUFACTURING A FIBER REINFORCED COMPOSITE ARTICLE

[75] Inventor: Thomas M. Foster, Colchester, Ill.

[73] Assignee: Composite Manufacturing & Research Inc., Allen, Tex.

[21] Appl. No.: 315,751

[22] Filed: Sep. 30, 1994

[51] Int. Cl.$^6$ .......................... B29C 70/44; B29C 70/48
[52] U.S. Cl. .................. 264/257; 264/258; 264/314
[58] Field of Search ................... 264/257, 258, 264/314, 510

[56] References Cited

U.S. PATENT DOCUMENTS

| | | | |
|---|---|---|---|
| 2,794,756 | 10/1952 | Leverenz | 154/43 |
| 3,117,273 | 4/1965 | Fingerhut et al. | 264/90 |
| 3,746,589 | 7/1973 | Reinke | 264/258 |
| 4,267,142 | 5/1981 | Lankheet | 264/510 |
| 4,311,661 | 1/1982 | Palmer | 264/510 |
| 4,312,829 | 1/1982 | Fourcher | 264/571 |
| 4,812,115 | 3/1989 | Kemp | 425/405.2 |
| 4,889,668 | 12/1989 | Kemp | 264/40.5 |
| 4,902,215 | 2/1990 | Seemann | 425/406 |
| 4,942,013 | 7/1990 | Palmer et al. | 264/511 |
| 5,023,041 | 6/1991 | Jones, et al. | 264/510 |
| 5,087,193 | 2/1992 | Herbert, Jr. | 264/257 |
| 5,152,949 | 10/1992 | Leoni et al. | 264/257 |
| 5,266,259 | 11/1993 | Harrison et al. | 264/257 |
| 5,328,656 | 7/1994 | Thulin | 264/102 |
| 5,364,584 | 11/1994 | Imanara et al. | 264/257 |

FOREIGN PATENT DOCUMENTS

| | | | |
|---|---|---|---|
| 3234973A1 | 3/1984 | Germany | 264/257 |
| 55-79117 | 6/1980 | Japan | 264/314 |
| 4-296538 | 10/1992 | Japan | 264/257 |

*Primary Examiner*—Robert Davis
*Attorney, Agent, or Firm*—Ross, Clapp, Korn & Montgomery, L.L.P.

[57] ABSTRACT

A method of molding an article of fiber reinforced material includes a step of providing a mold in the shape of the article for receiving fiber material. The mold includes a top and a bottom. A source of liquid resin located exterior of the mold is provided. The liquid resin is supplied from the source to the bottom of the mold and contacts the fiber materials. The liquid resin is allowed to wick throughout the fiber material from the bottom of the mold to the top of the mold through capillary action while the source of liquid resin is moved from the bottom of the mold to the top of the mold thereby saturating the fiber material with the liquid resin. The liquid resin is then allowed to cure, and the article is then removed from the mold.

12 Claims, 1 Drawing Sheet

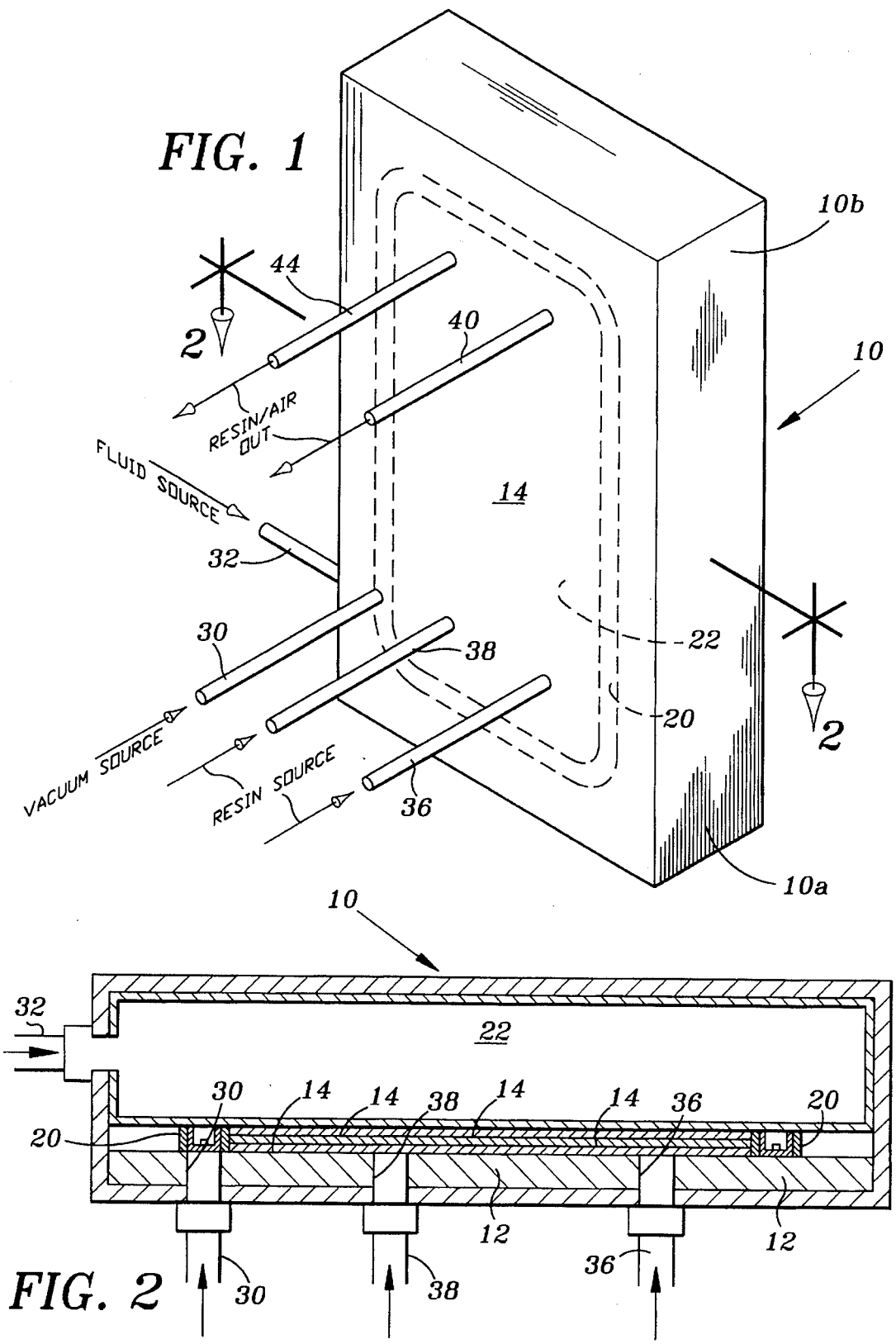

METHOD FOR MANUFACTURING A FIBER REINFORCED COMPOSITE ARTICLE

TECHNICAL FIELD OF THE INVENTION

The present invention relates to the manufacture of fiber reinforced composite articles, and more particularly to capillary resin transfer molding.

BACKGROUND OF THE INVENTION

Due to the high strength to weight ratio, fiber reinforced composite structures have become attractive for aerospace application, such as for example, parts for airframes and propulsion power plants, and for reinforcing various type structures. Molding of such parts has been expensive, relatively time consuming and labor intensive because of the need to position elements accurately in the mold, and to carry out the process slowly to avoid porosity, air entrapment and other internal and surface defects during polymerization, cross-linking or hardening of the resin in the fiber material. Additionally, systems have required the generation of high pressures to uniformly spread the resin in the fiber.

Fiber reinforced organic resin composite structures are fabricated using two basic forms of materials, prepreg, "B" stage, resin impregnated fiber forms, and wet resin impregnation of fiber forms.

In the prepreg process, woven cloth or fabric is impregnated at one facility, with a prescribed amount of resin. The resin is staged and dried, to a "tacky" or "B" stage condition in a partially cured condition. The material is then packaged between layers of separation film and stored in containers for extended periods of time before the fabric is used and fully cured for final part processing.

The prepreg operation has a number of disadvantages. The operation requires separate manufacturing facilities, and the "B" stage material must be stored at low temperature and in sealed containers to avoid contact with moisture. The resins must be conditioned to a specific state of polymerization, and the process must be stopped to retain the "tack" condition over an extended period of time.

In the wet resin impregnation process, woven cloth or fiber is impregnated with a liquid resin that is catalyzed to process or cure in a short continuous period of time. In this process, the resin is impregnated by squeegee of ply by ply of a layup at the site of component fabrication. The impregnated material may be handled at room temperature or elevated temperature for a certain period during which the resin gels, followed by final curing either at room temperature or elevated temperature in the same tool or mold.

A wet resin impregnation process referred to as resin transfer molding (RTM) is a process to saturate the fabric with resin using two-sided tooling that is usually metal to withstand extreme pressures needed to force the resin through the fabric. The tool may be heated in order to lower the viscosity of the resin, and large presses are utilized to hold the mold together. Heat is supplied with hot oil or heating elements placed in the mold. Because of the great hydraulic pressure that is generated as the resin is pushed into the fabric to saturate the fabric, the mold will try to expand outwardly and open the internal clearances when the resin is injected into the mold. If the mold is fabricated correctly, the resin will form a wave front and move across the fabric uniformly. However, if the machining clearances vary even a few hundred thousands of an inch, the fabric will be squeezed more in one area than another and the resin will move in the path of least resistance. The areas that are compressed too much will eventually form air pockets as the resin surrounds these areas and air voids form.

Current RTM technology suffers from the unpredictability of the formation of the resin wave. Typically, aerospace grade parts using the RTM process are made with the same number of plies of fabric throughout the part. Placement of the fiber plies in the mold and machining of the mold must match precisely. If the number of fabric plies varies, the placement of ply changes must precisely match thickness changes in the mold itself. This task is difficult in a production environment.

An additional disadvantage of a wet resin process is that personnel may come in direct contact with the resin, which is undesirable. Additionally, it is difficult to create uniform resin content free of voids and bubbles. Wet resin content fabricated products are usually of higher resin content than similar prepreg fabricated products in order to ensure freedom of void within the laminant, and thus such articles are heavier than articles made from prepreg materials.

An additional form of wet resin process utilizes vacuum to draw the resin through the fabric. Resin and catalyst systems are mixed in a container, and then introduced from the container to a dry cloth fiber reinforced layer placed in a tool. A vacuum bag is placed over the dry cloth layup with an inlet tube from the resin container to an edge of the layup under the vacuum bag. The vacuum bag outlet to the vacuum source is at the center of the assembly. When a vacuum is pulled, the bag pulls against the layup, and when the resin is released, the resin passes through the tube from the resin container and impregnates the fiber reinforcement or cloth from the edge thereof. Thereafter, resin flow proceeds toward the vacuum outlet at the center of the fiber reinforcement. When the resin reaches the vacuum outlet, the article is impregnated, and the resin inlet is sealed to stop any additional resin flow. The cure cycle is completed with continued vacuum pressure and heat.

Vacuum techniques are deficient due to pressure limitations of the vacuum as well as limitations in the size of the article to be fabricated. Vacuum techniques do not satisfactorily impregnate close weave fiber reinforcement, such as carbon fiber panels, entirely along the length and width thereof, to useful large size. Vacuum techniques further have difficulty achieving low air voids.

A need has thus arisen for an improved method for manufacturing fiber reinforced composite articles in order to produce aerospace quality composite parts having high fiber volume and low air void content.

A need has arisen for a process to create composite parts having ply areas with different reinforcement. A process is needed to enable the fabrication of a part in which areas needing reinforcement can be fabricated with extra plies of fabric, to specifically address load paths in the articles, while complementing the capability of composite construction to reinforce areas of stress, or use less material where the strength of thicker layers is not required.

A need has further risen for a process of manufacturing composite articles which can be constructed with the strength of additional plies located along predetermined load paths without major changes in existing molds, which parts are fabricated to achieve consistent fiber volumes with lack of air voids throughout the final part.

SUMMARY OF THE INVENTION

The present method for manufacturing fiber reinforced composite articles creates articles of aerospace quality through a combination of siphoning, wicking and capillary action.

In accordance with the present invention, a method of molding an article of fiber reinforced material includes a step of providing a mold in the shape of the article for receiving fiber material. The mold includes a top and a bottom. A source of liquid resin located exterior of the mold is provided. The liquid resin is supplied from the source to the bottom of the mold and contacts the fiber materials. The liquid resin is allowed to wick throughout the fiber material from the bottom of the mold to the top of the mold through capillary action while the source of liquid resin is moved from the bottom of the mold to the top of the mold thereby saturating the fiber material with the liquid resin. The liquid resin is then allowed to cure, and the article is then removed from the mold.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 1 is a diagrammatic illustration of a mold utilized to perform the present method; and FIG. 2 is a cross-sectional view taken generally along sectional lines 2—2 of FIG. 1.

DESCRIPTION OF THE PREFERRED EMBODIMENTS

Referring simultaneously to FIGS. 1 and 2, a mold, generally identified by the numeral 10 is illustrated for use in carrying out the method of the present invention. Mold 10 is configured for forming an article of manufacture for impregnating a dry fiber reinforcement with a resin according to the present invention.

Disposed within mold 10 is a tool 12 (FIG. 2). Tool 12 has the configuration of the part desired to be fabricated. Dry fiber reinforcement layers of material 14 are placed against tool 12. FIG. 2 illustrates three layers or plies of material 14 within tool 12. Any number of layers 14 and any configuration of layers 14 to provide areas of reinforcement in the part may be utilized with the present invention to manufacture a fiber reinforced article.

Layers of material 14 may be in the form of dry fibers, woven cloth, braided cloth, knit cloth, mat, stitched layers of material, tow, yarn, tape, and the like. The fiber reinforcement can be comprised of, for example, various materials, including glass fiber, carbon, graphite, boron, aramide, and such materials marketed as Kevlar, and the like. Carbon reinforcement materials are particularly preferred due to their high strength and high modulus.

Tool 12 includes a continuous seal 20 around its perimeter for receiving an inflatable bladder or bag 22. Bag 22 is disposed within mold 10 to provide a cover for the layers of material 14 and is in direct contact with the top layer 14 of the ply of layers 14. Bag 22 engages seal 20 of tool 12 and is held in place utilizing a vacuum created within seal 20 through the use of a vacuum applied via a conduit 30. This seal is in place to create a positive control area for the resin. This seal could be a mechanical or a solid glued seal. The intent is to have control over the resin to allow the process to occur. During the process of fabricating a reinforced article in accordance with the present invention, bag 22 is periodically inflated and deflated through the use of a fluid supply, air or liquid, introduced into bag 22 through a conduit 32.

Resin is introduced into mold 10 for application directly to layers 14 utilizing conduits 36 and 38. The supply source for resin introduced into conduits 36 and 38 is located external of mold 10 and is movable with respect to mold 10 to move upwardly from bottom 10a of mold 10 to the top 10b of mold 10. During the course of manufacturing articles in accordance with the present invention, the top 10b of mold 10 must be elevated with respect to bottom 10a. Resin 10 utilized with the present invention may be selected from various resin systems including, for example, epoxy, epoxy novolacs, and other thermosetting resins, such as for example, vinylesters, polyesters, polyimides, both condensation and additional types, phenolic resins, and the like. The resin system is selected with respect to a particular fiber reinforcement for producing a finished article with the desired mechanical and environmental properties.

Also disposed within mold 10 are conduits 40 and 44 which are in contact with layers of material 14 for withdrawing air and excess resin from mold 10 during the process of manufacturing an article in accordance with the present method.

After layers of material 14 have been inserted within tool 12 and bag 22 initially inflated to compress layers of material 14, resin is allowed to flow via conduits 36 and 38 into mold 10. Initial resin introduction into mold 10 is provided by siphoning the source of resin under hydraulic pressure. As previously stated, the source of the resin source retainer must be movable from bottom 10a to top 10b of mold 10 as the resin impregnates layers 14. The resin introduced into layers of material 14 is then allowed to wick through capillary action to penetrate the layers 14 from bottom 10a to top 10b of mold 10. The wicking action is similar to the migration of kerosene into the wick of a lamp. Resin follows the continuous weave of layers 14 in a similar manner. The capillary action as with liquids allows resin to rise against gravity within mold 10. The fibers within material layers 14 act like glass tubes to absorb the resin introduced via conduits 36 and 38. The resin is absorbed in the fabric without the use of external pressure or vacuum applied to the layers 14 or mold 10.

As the resin wicks throughout the layer of materials 14, pressure differentials may be created within bag 22. Additionally, bag 22 may contain heating and cooling elements. Bag 22 may be filled with a liquid, and the liquid may be heated or cooled or pressurized and circulated throughout the bag 22. The liquid may be introduced into bag 22 prior to bag 22 being inserted within mold 10. The temperature and pressure exerted by bag 22 allows the resin to be heated to control the flow of resin and the timing of the curing cycle of layers of material 14. By pulsating or changing pressures in bag 22, the pressure exerted on air bubbles trapped within material layers 14 is changed, and the air bubbles respond by changing volume, allowing the bubbles to be displaced from the resin and moved to area 10b of mold 10 to be withdrawn from mold 10 via conduits 40 and 44. As a result, areas of air remaining within material layers 14 in the cured articles produced in accordance with the present invention are kept to a minimum. Air is also removed from mold 10 through the process of convection, the property of a gas or liquid to rise when heated. The resin sets creating an exothermic reaction and the generated heat from the setting resin drives air bubbles upwardly, displacing air voids.

During the process of resin moving upwardly within mold 10, the source container of resin is also moved upwardly external of mold 10 above the wick line, the boundary between resin impregnated fiber and non-impregnated fiber. When the resin has reached top 10b of mold 10 and saturated the entire layers of material 14, excess resin is removed via conduits 40 and 44.

The wicking action utilized in order to move resin from bottom 10a of mold 10 to the top 10b of mold 10 thereby saturating layers of material 14 is accomplished without the use of vacuum or extreme pressures as utilized with previously developed methods. Any configuration of a part can be fabricated utilizing the present method determined by the shape of tool 12 and the number of layers of material 14 utilized. Areas of the part which require reinforcement can be provided within tool 12.

Once the resin has risen to the top 10b of mold 10, the supply of resin to mold 10 is terminated. Pressure may be increased within bag 22 in order to squeeze excess resin from layers of material 14. After a predetermined time interval, the resin is allowed to cure. Once cured, the part may be removed from tool 12 and mold 10.

It therefore can be seen that the present invention provides for a method of producing a fiber reinforced article utilizing wicking and capillary action of the resin moving through the fiber. High pressures such as those associated with autoclave techniques or vacuum techniques are not utilized with the present method. High fiber volumes with low air voids can be achieved utilizing the present method. The present method has achieved aerospace quality composite parts having fiber volumes of over 50% with less than 2% air voids.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A method of molding an article of fiber reinforced materials comprising the steps of:

providing a mold in the shape of the article for receiving fiber material, the mold having a top and a bottom, the mold top being elevated with respect to the bottom;

placing plies of fiber material into the mold;

providing a source of liquid resin exterior of the mold;

supplying the liquid resin from the source to the bottom of the mold and in contact with the plies of fiber material;

allowing the liquid resin to wick throughout the plies of fiber material from the bottom of the mold to the top of the mold through capillary action without applying injection pressure to the liquid resin or applying vacuum to the plies of fiber material while moving the source of liquid resin from the bottom of the mold to the top of the mold adjacent to the boundary between resin impregnated fiber material and non-impregnated fiber material thereby saturating the plies of fiber material with the liquid resin;

curing the liquid resin to form the article; and removing the article from the mold.

2. The method of claim 1 when the plies of fiber material includes plies of fabric.

3. The method of claim 1 and further including the step of withdrawing air from the top of the mold.

4. The method of claim 1 and further including the step of periodically applying and releasing pressure to the plies of fiber material in the mold as the liquid resin wicks throughout the plies of fiber material.

5. The method of claim 4 wherein the step of applying and releasing pressure includes providing an inflatable bag and periodically inflating and deflating the bag.

6. The method of claim 5 wherein the step of periodically inflating and deflating the bag includes supplying air pressure to the bag.

7. The method of claim 5 wherein the step of periodically inflating and deflating the bag includes supplying a liquid to the bag.

8. The method of claim 7 and further including heating and cooling the liquid supplied to the bag.

9. A method of molding an article of fiber reinforced materials comprising the steps of:

providing a mold in the shape of the article for receiving fiber material, the mold having a top and a bottom, the mold top being elevated with respect to the bottom;

placing plies of fiber material into the mold;

placing an inflatable bag adjacent to the plies of fiber material to form a cover member for the mold;

providing a source of liquid resin exterior of the mold;

supplying the liquid resin from the source to the bottom of the mold and in contact with the plies of fiber material;

allowing the liquid resin to siphon throughout the plies of fiber material from the bottom of the mold to the top of the mold through capillary action while moving the source of liquid resin from the bottom of the mold to the top of the mold thereby saturating the plies of fiber material with the liquid resin;

periodically applying pressure to the plies of fiber material in the mold by alternately inflating and deflating the bag as the liquid resin siphons throughout the plies of fiber material;

curing the liquid resin to form the article; and removing the article from the mold.

10. The method of claim 9 wherein the step of periodically inflating and deflating the bag includes supplying air pressure to the bag.

11. The method of claim 9 wherein the step of periodically inflating and deflating the bag includes supplying a liquid to the bag.

12. The method of claim 11 and further including heating and cooling the liquid supplied to the bag.

* * * * *